(12) United States Patent
Pang

(10) Patent No.: US 12,036,911 B2
(45) Date of Patent: Jul. 16, 2024

(54) DUAL-PURPOSE CAMPER CAPABLE OF BEING TOWED BY A BICYCLE AND MANUALLY

(71) Applicant: QINGDAO TMZ TOOLS CO., LTD., Qingdao (CN)

(72) Inventor: Wei Pang, Qingdao (CN)

(73) Assignee: QINGDAO TMZ TOOLS CO., LTD., Qingdao (CN)

( * ) Notice: Subject to any disclaimer, the term of this patent is extended or adjusted under 35 U.S.C. 154(b) by 313 days.

(21) Appl. No.: 17/715,168

(22) Filed: Apr. 7, 2022

(65) Prior Publication Data
US 2023/0278481 A1 Sep. 7, 2023

(30) Foreign Application Priority Data
Mar. 4, 2022 (CN) .......................... 202220457051.7

(51) Int. Cl.
*B60P 3/34* (2006.01)
*B60R 9/06* (2006.01)

(52) U.S. Cl.
CPC ............. *B60P 3/341* (2013.01); *B60R 9/06* (2013.01)

(58) Field of Classification Search
CPC .......... B60P 3/341; B60R 9/06; B62K 15/00; B62K 27/003; B62K 27/12; B62B 5/0079; B62B 3/007
See application file for complete search history.

(56) References Cited

U.S. PATENT DOCUMENTS

| 2,725,242 | A | * | 11/1955 | Peplin | B62K 27/12 280/415.1 |
| 3,913,968 | A | * | 10/1975 | Luppens | B62J 19/00 135/88.13 |
| 4,037,853 | A | * | 7/1977 | Sparks | B62J 7/04 280/204 |
| 4,342,467 | A | * | 8/1982 | Kester | B62K 27/12 280/475 |
| 5,911,422 | A | * | 6/1999 | Carpenter | B62B 13/18 280/10 |

(Continued)

FOREIGN PATENT DOCUMENTS

| AU | 2019101423 A4 | * | 1/2020 | ............. B62B 3/007 |
| CA | 2654421 A1 | * | 1/2009 | ............. B60P 3/341 |

(Continued)

*Primary Examiner* — Lori Lyjak
(74) *Attorney, Agent, or Firm* — Panitch Schwarze Belisario & Nadel LLP

(57) ABSTRACT

The present invention provides a dual-purpose camper capable of being towed by a bicycle and manually, including vehicle frames and a bicycle beam; a pull rod is rotatably connected between the two vehicle frames; a front bracket and a rear bracket are rotatably connected between the front end and the rear end of one side of the vehicle frames opposite to the pull rod; a fixing rod is rotatably connected in a fixing block; and the top end of the fixing rod penetrates through and is slidably connected with a sliding rod. A stable triangular structure is formed by a supporting rod and a second connecting rod; and the downward pressure of the vehicle frames after heavy loading is supported. The direction can be rotated and adjusted arbitrarily by a fisheye bearing to ensure the stability and directional control in the towing process of a bicycle.

8 Claims, 4 Drawing Sheets

(56) References Cited

U.S. PATENT DOCUMENTS

| | | | | |
|---|---|---|---|---|
| 6,042,175 | A * | 3/2000 | Williams | B62D 63/064 |
| | | | | 296/100.06 |
| 6,296,297 | B1 * | 10/2001 | Barrow | B60P 3/341 |
| | | | | 296/168 |
| 6,766,769 | B1 * | 7/2004 | Doyle | B62K 27/04 |
| | | | | 280/204 |
| 7,152,554 | B2 * | 12/2006 | Crawford | B60P 3/04 |
| | | | | 119/453 |
| 7,503,574 | B1 * | 3/2009 | Reid | B62K 27/04 |
| | | | | 280/204 |
| 9,950,727 | B1 * | 4/2018 | Pang | B62B 3/001 |
| D880,799 | S * | 4/2020 | Pang | D34/12 |
| 10,633,010 | B1 * | 4/2020 | Zhang | B62B 3/025 |
| 10,940,912 | B1 * | 3/2021 | Fricke | B62K 27/02 |
| D921,321 | S * | 6/2021 | Pang | D34/12 |
| D922,020 | S * | 6/2021 | Pang | D34/12 |
| D926,413 | S * | 7/2021 | Pang | D34/12 |
| 2011/0198825 | A1 * | 8/2011 | James | B62B 5/0079 |
| | | | | 280/415.1 |
| 2015/0014950 | A1 * | 1/2015 | Huskey | B62D 63/062 |
| | | | | 280/63 |
| 2022/0087212 | A1 * | 3/2022 | Lopez | B62K 27/003 |
| 2022/0340183 | A1 * | 10/2022 | Sun | B62B 3/025 |
| 2023/0286604 | A1 * | 9/2023 | Gibson | B62K 27/00 |

FOREIGN PATENT DOCUMENTS

| | | | | |
|---|---|---|---|---|
| CA | 2925991 | A1 * | 10/2017 | |
| CN | 109305205 | A * | 2/2019 | B62B 3/007 |
| CN | 210822332 | U * | 6/2020 | B62B 3/02 |
| DE | 4244206 | A1 * | 6/1994 | B62K 13/025 |
| DE | 10257932 | A1 * | 7/2004 | B62B 1/002 |
| DE | 102011103757 | A1 * | 12/2012 | B62B 7/126 |
| DE | 202014005444 | U1 * | 8/2014 | B62B 1/10 |
| DE | 202014009415 | U1 * | 3/2015 | B60F 3/0084 |
| EP | 2151365 | A1 * | 2/2010 | B62B 3/007 |
| EP | 3385146 | A1 * | 10/2018 | B62B 3/007 |
| FR | 3021024 | A1 * | 11/2015 | B60D 1/1675 |
| GB | 2496927 | A * | 5/2013 | A45C 13/262 |
| KR | 20190036250 | A * | 4/2019 | |
| WO | WO-2021027808 | A1 * | 2/2021 | |
| WO | WO-2021073360 | A1 * | 4/2021 | B62B 3/007 |

* cited by examiner

DUAL-PURPOSE CAMPER CAPABLE OF BEING TOWED BY A BICYCLE AND MANUALLY

TECHNICAL FIELD

The present invention relates to the technical field of campers, and in particular to a dual-purpose camper capable of being towed by a bicycle and manually.

BACKGROUND

At present, with the progress of the society, the leisure concept of Chinese people is also changing quietly, and outdoor cycling and camping have gradually become a symbol of fashionable and healthy life. However, due to the limitation of capacity, a bicycle cannot satisfy the transportation capacity demand of a large number of camping supplies. Traditional camping trailers can satisfy the capacity demand, but mainly rely on human towing, which is very physical. Some people consider combining knot tying with the bicycle. Although the problem of physical exertion is solved, it is difficult to control during running because the traditional camper has limitations of control function in design, easily leading to safety problems.

The present invention can simultaneously solve the problem of capacity limitation of the camping bicycle and the control problem of dragging safety of the traditional camper, so as to provide a new, safe and perfect leisure experience for Chinese people.

SUMMARY

With respect to the defects in the prior art, the present invention provides a dual-purpose camper capable of being towed by a bicycle and manually, which solves the problem of capacity limitation of a camping bicycle and the problem of safety control of a traditional camper.

To achieve the above purpose, the present invention is realized through the following technical solution: a dual-purpose camper capable of being towed by a bicycle and manually comprises vehicle frames and a bicycle beam; a pull rod is rotatably connected between the two vehicle frames; a front bracket and a rear bracket are rotatably connected between the front end and the rear end of one side of the vehicle frames opposite to the pull rod; a transverse rod is fixedly connected at a position near the top between the front end and the rear end of the front bracket; a first bucket is fixedly connected at a left middle position of the transverse rod; a fixing block is fixedly connected at a left bottom middle position of the front bracket; a fixing rod is rotatably connected in the fixing block, and the middle of the fixing rod near the position of the top is slidably connected with the first bucket; the top end of the fixing rod penetrates through and is slidably connected with a sliding rod; the top end of the sliding rod is fixedly connected with a handrail; the outer diameter of the top end of the fixing rod is fixedly connected with a connecting ring; a first connecting rod is rotatably connected in the connecting ring; the internal front end of the first connecting rod penetrates through and is slidably connected with an extension rod; and the front end of the first connecting rod is provided with a locking nut.

Preferably, one end of the extension rod is fixedly connected with a fisheye bearing; a second connecting rod is rotatably connected in the fisheye bearing; the bottom of the second connecting rod is fixedly connected with a rotating block; the rotating block is rotatably connected with a supporting rod; one end of the second connecting rod and one end of the supporting rod are fixedly connected with locking rings; and the locking rings are slidably connected with the bicycle beam.

Preferably, the front end and the rear end of the bottom of the front bracket are rotatably connected with fixing frames; front wheels are rotatably connected in the fixing frames; the bottoms of the front end and the rear end of the rear bracket are in threaded connection with fixing screws; and rear wheels are rotatably connected at the middle positions of the fixing screws.

Preferably, limiting plates are rotatably connected at middle positions of the front end and the rear end of one side, adjacent to the vehicle frames, of the front bracket and the rear bracket; a rotating frame is rotatably connected between the two limiting plates which are opposite to each other at front and rear; and both ends of the bottom of the rotating frame are rotatably connected with the pull rod.

Preferably, rotating rods are rotatably connected on the inner sides of the front end and the rear end of the bottoms of the front bracket and the rear bracket; the two rotating rods opposite to each other on the left and right sides are rotatably connected; and the middle positions of the rotating rods are rotatably connected with the middle position of the rotating frame.

Preferably, the bottom left side of the first connecting rod is fixedly connected with a second buckle, and the second buckle and the fixing rod are rotatably connected.

Preferably, the middle position of the front rotating rod is provided with an installation lock.

Preferably, the left sides of the locking rings respectively penetrate through and are provided with fixing screws, and the fixing screws are located on the left side of the bicycle beam.

Working principle: the locking ring at one end of the second connecting rod slides into the bicycle beam; the locking ring is fixed through the fixing screws; through rotary connection between the supporting rod and the rotating block, the angle between the supporting rod and the second connecting rod can be adjusted, so that the locking ring at one end of the supporting rod slides into the bicycle beam; the locking ring on the supporting rod is fixed through the fixing screws; a stable triangular structure is formed by the supporting rod and the second connecting rod; the downward pressure of the vehicle frames after heavy loading is supported, and the angle between the supporting rod and the second connecting rod is adjusted; the first connecting rod is pulled outward so that the second buckle and the fixing rod fall off; the extension rod is pulled outward and adjusted to an appropriate length; a locking nut is rotated to fix the position of the extension rod; the fisheye bearing at one end of the extension rod is overlapped on the top right side of the second connecting rod; the direction can be adjusted arbitrarily by the fisheye bearing to ensure the stability and directional control in the towing process of a bicycle; the rear wheels are larger than the front wheels; and the front wheels are lifted off the ground in the towing process of the bicycle, thereby reducing bump and improving the operation stability of the vehicle. The first connecting rod is fixed on the fixing rod through the second buckle, and then the fixing rod is pulled outward so that the fixing rod and the first buckle fall off; the handrail is pulled to realize rotation between the fixing rod and the fixing block; and the camper can be manually dragged. The rotating rod is rotatably connected with the front bracket and the rear bracket respectively, and the rotation is realized between the rotating frame and the rotating rod; at the same time, the rotating frame rotates between the front bracket and the rear bracket through the limiting plate; the vehicle frames can be folded; when folding, the angle between the rotating rod and the rotating frame becomes smaller, while the rotating frame is gradually perpendicular to the ground, until the rotating frame is fitted with the front bracket and the rear bracket respectively; and the camper can be folded.

The present invention provides a dual-purpose camper capable of being towed by a bicycle and manually. The present invention has the following beneficial effects:
1. In the present invention, the locking ring at one end of the second connecting rod slides into the bicycle beam; the locking ring is fixed through the fixing screws; through rotary connection between the supporting rod and the rotating block, the angle between the supporting rod and the second connecting rod can be adjusted, so that the locking ring at one end of the supporting rod slides into the bicycle beam; the locking ring on the supporting rod is fixed through the fixing screws; a stable triangular structure is formed by the supporting rod and the second connecting rod; the downward pressure of the vehicle frames after heavy loading is supported, and the angle between the supporting rod and the second connecting rod is adjusted to adapt to different models of bicycles; the first connecting rod is pulled outward so that the second buckle and the fixing rod fall off; the extension rod is pulled outward and adjusted to an appropriate length; a locking nut is rotated to fix the position of the extension rod; the fisheye bearing at one end of the extension rod is overlapped on the top right side of the second connecting rod; the direction can be adjusted arbitrarily by the fisheye bearing to ensure the stability and directional control in the towing process of the bicycle; the rear wheels are larger than the front wheels; and the front wheels are lifted off the ground in the towing process of the bicycle, thereby reducing bump and improving the operation stability of the vehicle.
2. In the present invention, the rotating rod is rotatably connected with the front bracket and the rear bracket respectively, and the rotation is realized between the rotating frame and the rotating rod; at the same time, the rotating frame rotates between the front bracket and the rear bracket through the limiting plate; the vehicle frames can be folded; when folding, the angle between the rotating rod and the rotating frame becomes smaller, while the rotating frame is gradually perpendicular to the ground, until the rotating frame is fitted with the front bracket and the rear bracket respectively; and the camper can be folded. The occupied area of the vehicle frames is reduced when the camper is idle.
3. In the present invention, the first connecting rod is fixed on the fixing rod through the second buckle, and then the fixing rod is pulled outward so that the fixing rod and the first buckle fall off; the handrail is pulled to realize rotation between the fixing rod and the fixing block; and the camper can be manually dragged. The use is more convenient.

Wherein 1 vehicle frame; 2 front wheel; 3 rear wheel; 4 first connecting rod; 5 fixing block; 6 fixing rod; 7 first buckle; 8 connecting ring; 9 sliding rod; 10 extension rod; 11 fisheye bearing; 12 second connecting rod; 13 rotating block; 14 supporting rod; 15 locking ring; 16 fixing screw; 17 locking nut; 18 second buckle; 19 front bracket; 20 rear bracket; 21 limiting plate; 22 rotating frame; 23 rotating rod; 24 installation lock; 25 fixing frame; 26 transverse rod; 27 pull rod; 28 handrail; 29 bicycle beam; 30 fixing screw.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiments

Figure 1:
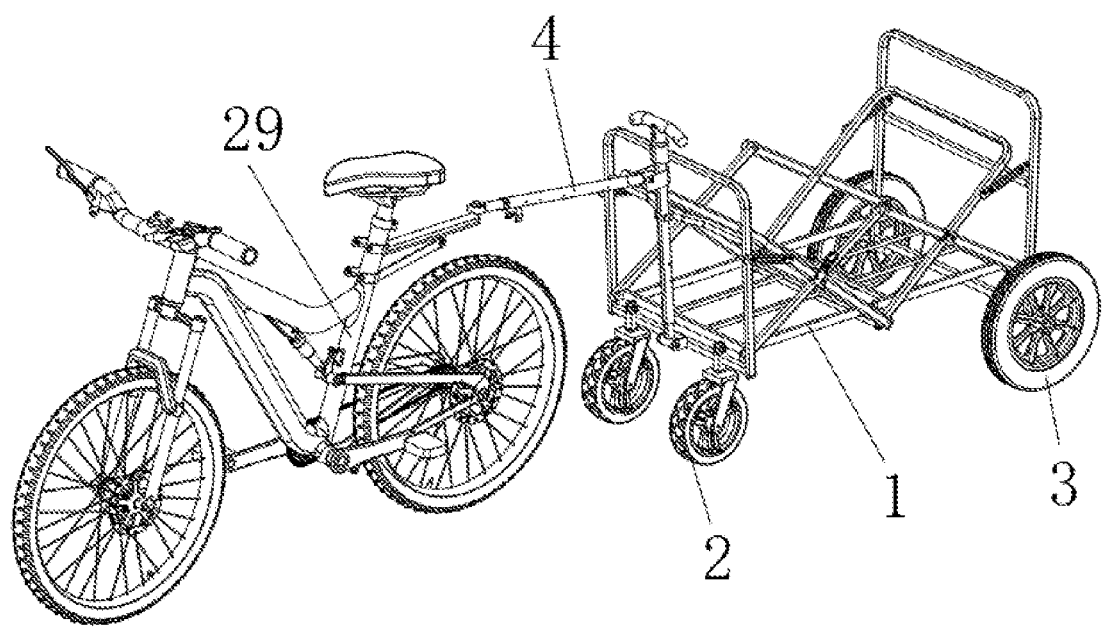
FIG. 1 is a schematic diagram of bicycle dragging of the present invention.
Figure 2:
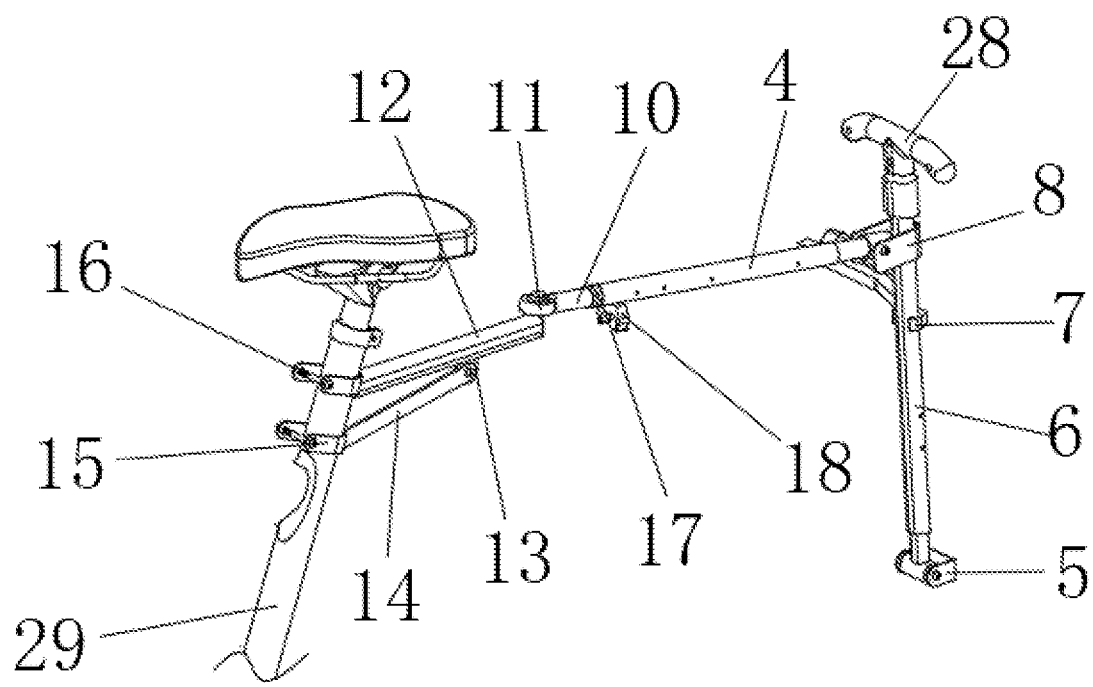
FIG. 2 is a partial structural diagram of a first connecting rod of the present invention.
Figure 3:
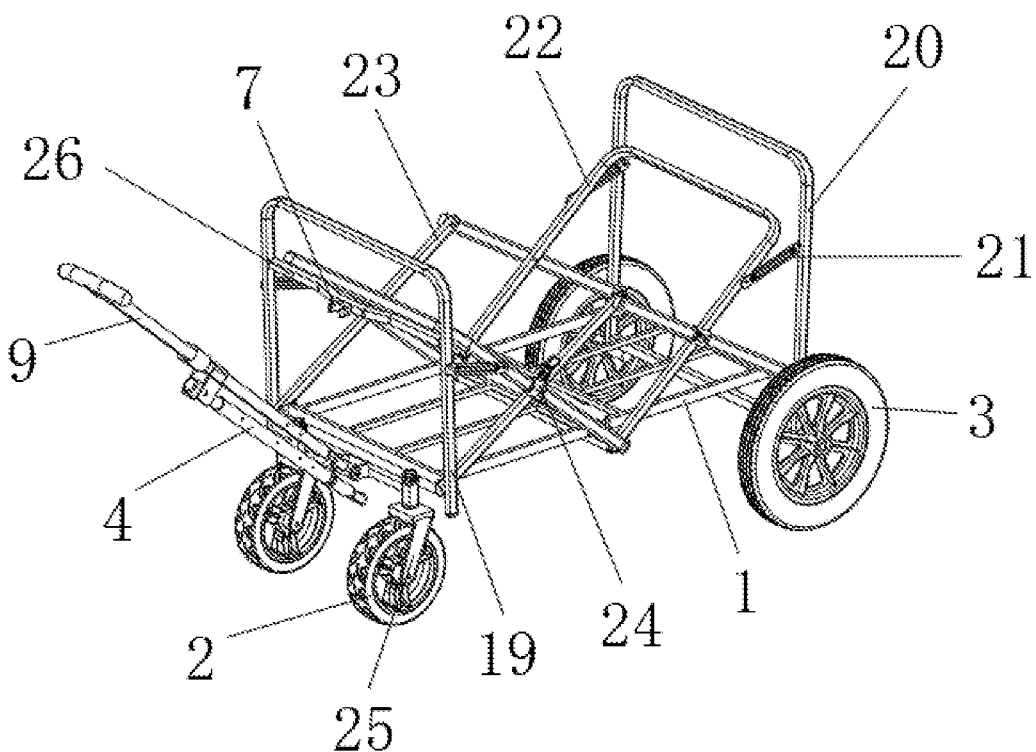
FIG. 3 is a stereographic schematic diagram of manual dragging of the present invention.
Figure 4:
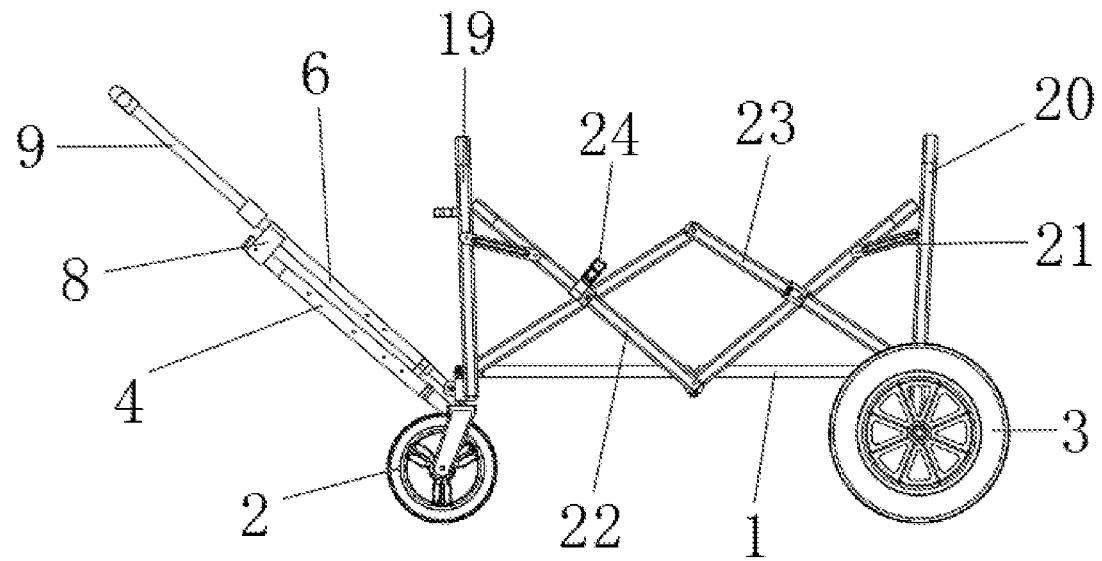
FIG. 4 is a front view of manual dragging of the present invention.
Figure 5:
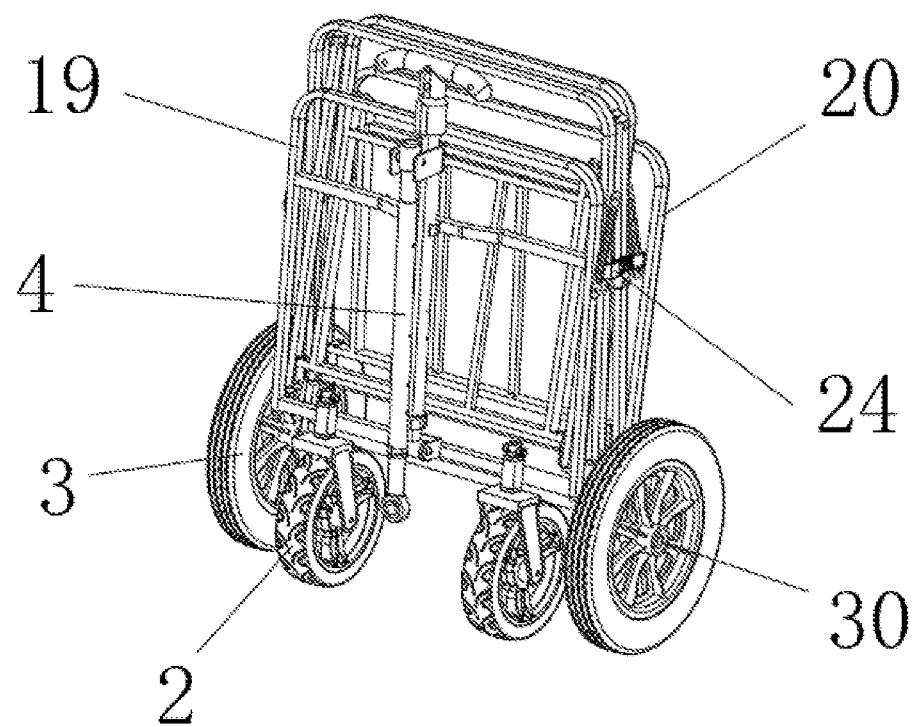
FIG. 5 is a stereographic schematic diagram of folding of the present invention.
Figure 6:
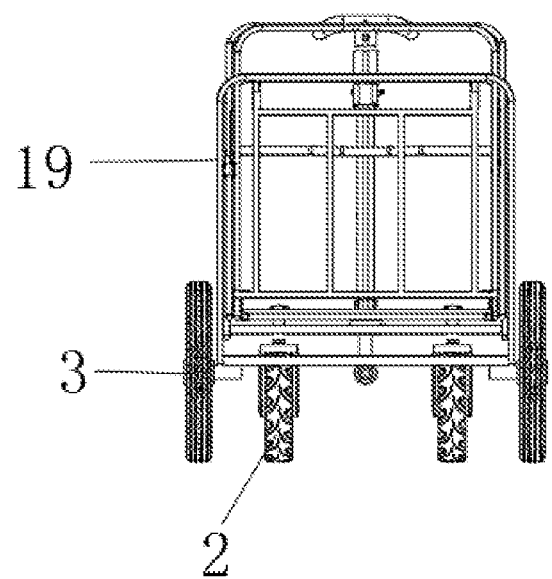
FIG. 6 is a side view of folding of the present invention.
Figure 7:
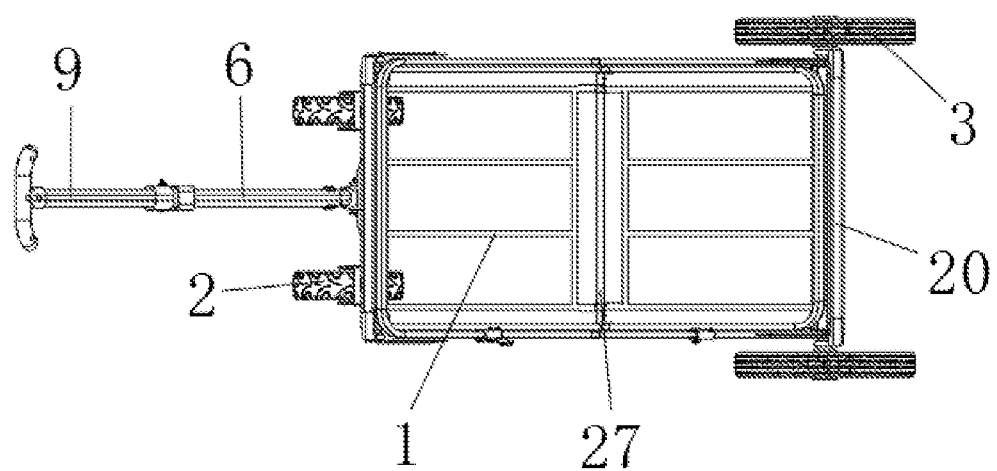
FIG. 7 is a top view of vehicle frames of the present invention.

As shown in FIGS. 1-7, embodiments of the present invention provide a dual-purpose camper capable of being towed by a bicycle and manually, comprising vehicle frames 1 and a bicycle beam 29. A pull rod 27 is rotatably connected between the two vehicle frames 1; a front bracket 19 and a rear bracket 20 are rotatably connected between the front end and the rear end of one side of the vehicle frames 1 opposite to the pull rod 27; a transverse rod 26 is fixedly connected at a position near the top between the front end and the rear end of the front bracket 19; a first bucket 7 is fixedly connected at a left middle position of the transverse rod 26; a fixing block 5 is fixedly connected at a left bottom middle position of the front bracket 19; a fixing rod 6 is rotatably connected in the fixing block 5, and the middle of the fixing rod 6 near the position of the top is slidably connected with the first bucket 7; the top end of the fixing rod 6 penetrates through and is slidably connected with a sliding rod 9; the top end of the sliding rod 9 is fixedly connected with a handrail 28; the outer diameter of the top end of the fixing rod 6 is fixedly connected with a connecting ring 8; a first connecting rod 4 is rotatably connected in the connecting ring 8; the internal front end of the first connecting rod 4 penetrates through and is slidably connected with an extension rod 10; and the front end of the first connecting rod 4 is provided with a locking nut 17. The first connecting rod 4 is pulled outward so that the second buckle 18 and the fixing rod 6 fall off; the extension rod 10 is pulled outward and adjusted to an appropriate length; a locking nut 17 is rotated to fix the position of the extension rod 10; the fisheye bearing 11 at one end of the extension rod 10 is overlapped on the top right side of the second connecting rod 12; the direction can be adjusted arbitrarily by the fisheye bearing 11 to ensure the stability and directional control in the towing process of the bicycle; the rear wheels 3 are larger than the front wheels 2; and the front wheels 2 are lifted off the ground in the towing process of the bicycle, thereby reducing bump and improving the operation stability of the vehicle.

One end of the extension rod 10 is fixedly connected with a fisheye bearing 11; a second connecting rod 12 is rotatably connected in the fisheye bearing 11; the bottom of the second connecting rod 12 is fixedly connected with a rotating block 13; the rotating block 13 is rotatably connected with a supporting rod 14; one end of the second connecting rod 12 and one end of the supporting rod 14 are fixedly connected with locking rings 15; and the locking rings 15 are slidably connected with the bicycle beam 29. The locking ring 15 at one end of the second connecting rod 12 slides into the bicycle beam 29; the locking ring 15 is fixed through the fixing screws 16; through rotary connection between the supporting rod 14 and the rotating block 13, the angle between the supporting rod 14 and the second connecting rod 12 can be adjusted, so that the locking ring 15 at one end of the supporting rod 14 slides into the bicycle beam 29; the locking ring 15 on the supporting rod 14 is fixed through the fixing screws 16; a stable triangular structure is formed by the supporting rod 14 and the second connecting rod 12; the downward pressure of the vehicle frames 1 after heavy loading is supported, and the angle between the supporting rod 14 and the second connecting rod 12 is adjusted to adapt to different models of bicycles.

The front end and the rear end of the bottom of the front bracket 19 are rotatably connected with fixing frames 25; front wheels 2 are rotatably connected in the fixing frames 25; the bottoms of the front end and the rear end of the rear bracket 20 are in threaded connection with fixing screws 30; and rear wheels 3 are rotatably connected at the middle positions of the fixing screws 30. The fixing screws 30 can be rotated to disassemble the rear wheels 3.

Limiting plates 21 are rotatably connected at middle positions of the front end and the rear end of one side, adjacent to the vehicle frames 1, of the front bracket 19 and the rear bracket 20; a rotating frame 22 is rotatably connected between the two limiting plates 21 which are opposite to each other at front and rear; and both ends of the bottom of the rotating frame 22 are rotatably connected with the pull rod 27.

Rotating rods 23 are rotatably connected on the inner sides of the front end and the rear end of the bottoms of the front bracket 19 and the rear bracket 20; the two rotating rods 23 opposite to each other on the left and right sides are rotatably connected; and the middle positions of the rotating rods 23 are rotatably connected with the middle position of the rotating frame 22. The rotating rod 23 is rotatably connected with the front bracket 19 and the rear bracket 20 respectively, and the rotation is realized between the rotating frame 22 and the rotating rod 23; at the same time, the rotating frame 22 rotates between the front bracket 19 and the rear bracket 20 through the limiting plate 21; the vehicle frames 1 can be folded; when folding, the angle between the rotating rod 23 and the rotating frame 22 becomes smaller, while the rotating frame 22 is gradually perpendicular to the ground, until the rotating frame 22 is fitted with the front bracket 19 and the rear bracket 20 respectively; and the camper can be folded. The occupied area of the vehicle frames is reduced when the camper is idle.

The bottom left side of the first connecting rod 4 is fixedly connected with a second buckle 18, and the second buckle 18 and the fixing rod 6 are rotatably connected. The first connecting rod 4 is fixed on the fixing rod 6 through the second buckle 18, and then the fixing rod 6 is pulled outward so that the fixing rod and the first buckle 7 fall off; the handrail 28 is pulled to realize rotation between the fixing rod 6 and the fixing block 5; and the camper can be manually dragged. The use is more convenient.

The middle position of the front rotating rod 23 is provided with an installation lock 24. After folding is completed, the left installation lock 24 bypasses the rotating frame 22 and the rear bracket 20 and is buckled on the right installation lock 24. The camper can be fixed after folded.

The left sides of the locking rings 15 respectively penetrate through and are provided with fixing screws 16, and the fixing screws 16 are located on the left side of the bicycle beam 29.

Although the embodiments of the present invention have been shown and described, it will be appreciated that various variations, amendments, replacements and modifications can be made by those ordinary skilled in the art without departing from the principle and spirit of the present invention, and the scope of the present invention is limited by the appended claims and the equivalents thereof.

The invention claimed is:

1. A dual-purpose camper capable of being towed by a bicycle and manually, comprising vehicle frames and a bicycle beam, wherein a pull rod is rotatably connected between the two vehicle frames; a front bracket and a rear bracket are rotatably connected between the front end and the rear end of one side of the vehicle frames opposite to the pull rod; a transverse rod is fixedly connected at a position near the top between the front end and the rear end of the front bracket; a first bucket is fixedly connected at a left middle position of the transverse rod; a fixing block is fixedly connected at a left bottom middle position of the front bracket; a fixing rod is rotatably connected in the fixing block, and the middle of the fixing rod near the position of the top is slidably connected with the first bucket; the top end of the fixing rod penetrates through and is slidably connected with a sliding rod; the top end of the sliding rod is fixedly connected with a handrail; the outer diameter of the top end of the fixing rod is fixedly connected with a connecting ring; a first connecting rod is rotatably connected in the connecting ring; the internal front end of the first connecting rod penetrates through and is slidably connected with an extension rod; and the front end of the first connecting rod is provided with a locking nut.

2. The dual-purpose camper capable of being towed by a bicycle and manually according to claim 1, wherein one end of the extension rod is fixedly connected with a fisheye bearing; a second connecting rod is rotatably connected in the fisheye bearing; the bottom of the second connecting rod is fixedly connected with a rotating block; the rotating block is rotatably connected with a supporting rod; one end of the second connecting rod and one end of the supporting rod are fixedly connected with locking rings; and the locking rings are slidably connected with the bicycle beam.

3. The dual-purpose camper capable of being towed by a bicycle and manually according to claim 1, wherein the front end and the rear end of the bottom of the front bracket are rotatably connected with fixing frames; front wheels are rotatably connected in the fixing frames; the bottoms of the front end and the rear end of the rear bracket are in threaded connection with fixing screws; and rear wheels are rotatably connected at the middle positions of the fixing screws.

4. The dual-purpose camper capable of being towed by a bicycle and manually according to claim 1, wherein limiting plates are rotatably connected at middle positions of the front end and the rear end of one side, adjacent to the vehicle frames, of the front bracket and the rear bracket; a rotating frame is rotatably connected between the two limiting plates which are opposite to each other at front and rear; and both ends of the bottom of the rotating frame are rotatably connected with the pull rod.

5. The dual-purpose camper capable of being towed by a bicycle and manually according to claim 1, wherein rotating rods are rotatably connected on the inner sides of the front end and the rear end of the bottoms of the front bracket and the rear bracket; the two rotating rods opposite to each other on the left and right sides are rotatably connected; and the middle positions of the rotating rods are rotatably connected with the middle position of the rotating frame.

6. The dual-purpose camper capable of being towed by a bicycle and manually according to claim 1, wherein the bottom left side of the first connecting rod is fixedly connected with a second buckle, and the second buckle and the fixing rod are rotatably connected.

7. The dual-purpose camper capable of being towed by a bicycle and manually according to claim 5, wherein the middle position of the front rotating rod is provided with an installation lock.

8. The dual-purpose camper capable of being towed by a bicycle and manually according to claim 2, wherein the left sides of the locking rings respectively penetrate through and are provided with fixing screws, and the fixing screws are located on the left side of the bicycle beam.

* * * * *